(12) United States Patent
El-Afandi et al.

(10) Patent No.: US 6,312,823 B1
(45) Date of Patent: *Nov. 6, 2001

(54) COMPOSTABLE MULTILAYER STRUCTURES, METHODS FOR MANUFACTURE AND ARTICLES PREPARED THEREFROM

(75) Inventors: Ali Zakareya El-Afandi, Woodbury; Patrick Richard Gruber, Blaine; Jeffrey John Kolstad, Wayzata; James Lunt, Minnetonka; Christopher M. Ryan, Dayton, all of MN (US); James Zakareya Nangeroni, Doylestown, PA (US); Nancy Uzelac Buehler, Minneapolis, MN (US); Mark Hartmann, Minnetonka, MN (US); Jed Richard Randall, Minneapolis, MN (US); Andrea Lee Brosch, Eden Prairie, MN (US)

(73) Assignee: Cargrill, Incorporated, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/162,523

(22) Filed: Sep. 29, 1998

Related U.S. Application Data

(63) Continuation of application No. 08/642,529, filed on May 3, 1996, now Pat. No. 5,849,401, which is a continuation-in-part of application No. 08/535,706, filed on Sep. 28, 1995, now Pat. No. 5,849,374.

(51) Int. Cl.[7] .................... B32B 27/08; B32B 27/10; B32B 27/36; B32B 31/16; B32B 31/30
(52) U.S. Cl. .............. 428/480; 428/481; 264/555; 264/563; 264/564; 264/572; 264/173.11; 264/173.12; 264/173.15; 156/244.11; 156/244.24
(58) Field of Search ................. 428/215, 34.2, 428/35.7, 480, 481; 264/555, 563, 564, 572, 173.11, 173.12, 173.15; 156/294.11, 244.24; 528/354

(56) References Cited

U.S. PATENT DOCUMENTS

| | | |
|---|---|---|
| 5,091,262 | 2/1992 | Knott et al. . |
| 5,108,807 | 4/1992 | Tucker . |

(List continued on next page.)

FOREIGN PATENT DOCUMENTS 0 514 137 A2   11/1992   (EP) .

(List continued on next page.)

OTHER PUBLICATIONS

Nonwovens Markets vol. 9, #7 (Apr. 8, 1994).

(List continued on next page.)

Primary Examiner—Vivian Chen
(74) Attorney, Agent, or Firm—Merchant & Gould P.C.

(57) ABSTRACT

A compostable multilayer film includes a core layer having a first surface and a second surface, a first blocking reducing layer covering the first surface of the core layer, and a second blocking reducing layer covering the second surface of the core layer. The core layer comprises a lactic acid residue-containing polymer having a glass transition temperature (Tg) below 20° C. At least one of the first and second blocking reducing layers comprise a semicrystalline aliphatic polyester. The core layer may be peroxide modified polylactide polymer which exhibits bridging between polylactide polymer chains.

24 Claims, 2 Drawing Sheets

U.S. PATENT DOCUMENTS

| | | |
|---|---|---|
| 5,180,765 | 1/1993 | Sinclair . |
| 5,216,050 | 6/1993 | Sinclair . |
| 5,247,059 | 9/1993 | Gruber et al. . |
| 5,247,073 | 9/1993 | Gruber et al. . |
| 5,252,642 | 10/1993 | Sinclair et al. . |
| 5,338,822 | 8/1994 | Gruber et al. . |
| 5,359,026 | 10/1994 | Gruber . |
| 5,391,423 | 2/1995 | Wunk et al. . |
| 5,424,346 | 6/1995 | Sinclair . |
| 5,444,113 | 8/1995 | Sinclair et al. . |
| 5,475,080 | 12/1995 | Gruber et al. . |
| 5,484,881 | 1/1996 | Gruber et al. . |
| 5,536,807 | 7/1996 | Gruber et al. . |
| 5,539,081 | 7/1996 | Gruber et al. . |
| 5,585,191 | 12/1996 | Gruber et al. . |
| 5,594,095 * | 1/1997 | Gruber et al. ........................ 528/354 |
| 5,849,374 * | 12/1998 | Gruber et al. ....................... 428/34.3 |
| 5,849,401 * | 12/1998 | El-Afandi et al. ................... 428/215 |

FOREIGN PATENT DOCUMENTS

| | | |
|---|---|---|
| 0589437A2 | | |
| 0587069A1 | 9/1993 | (EP) . ........ ........ 9/1993 ...... (EP) . |
| 0 640 474 A1 | 3/1995 | (EP) . |
| 5 329999 | 12/1993 | (JP) . |
| 8 323946 | 12/1996 | (JP) . |
| WO 90/01521 | 2/1990 | (WO) . |
| WO 90/03156 | 4/1990 | (WO) . |
| WO 92/04413 | 3/1992 | (WO) . |
| WO 94/00293 | 1/1994 | (WO) . |
| WO 94/06856 | 3/1994 | (WO) . |
| WO 94/06866 | 3/1994 | (WO) . |
| WO 94/07941 | 4/1994 | (WO) . |
| WO 94/08078 | 4/1994 | (WO) . |

OTHER PUBLICATIONS

Ishuang, S.L. et al., "Osteoblast function on synthetic biodegradable polymers", *J. Biomedical Materials Research*, vol. 28:1445–1453 (1994).

Nentwig, J., "Potential noch nicht ausgeschopft", *Nene Verpackung*, 47(5) (1994).

Monick, J.A., "Separation of Monoglycerides, Diglycerides and Triglycerides by Liquid–Liquid Extraction", NYU Laboratories, University Heights, New York (Mar. 1955).

Purasuchikkusa, 45(7):68–70 (1994).

* cited by examiner

COMPOSTABLE MULTILAYER STRUCTURES, METHODS FOR MANUFACTURE AND ARTICLES PREPARED THEREFROM

CROSS-REFERENCE TO RELATED APPLICATIONS

This application is a Continuation of application Ser. No. 08/642,329, filed May 3, 1996, and which issued as U.S. Pat. No. 5,849,401 on Dec. 15, 1998, which is a continuation-in-part of application Ser. No. 08/535,706, filed Sep. 28, 1995, and which issued as U.S. Pat. No. 5,849,374 on Dec. 15, 1998, application Ser. Nos. 08/642,329 and 08/535,706 being incorporated herein by reference in their entirety.

FIELD OF THE INVENTION

The present invention relates to compostable multilayer structures, methods for the manufacture of compostable multilayer structures, and articles prepared from compostable multilayer structures. More particularly, the compostable multilayer structures are films having desirable properties of flexibility and tear resistance and can be used to provide disposable bags or wrappers.

BACKGROUND OF THE INVENTION

Plastic trash bags and wrappers are primarily made of hydrocarbon polymers such as polyethylene, polypropylene, or polyvinyl polymers. While hydrocarbon polymers can be useful for commercially manufacturing trash bags and wrappers having adequate flexibility and puncture and tear resistance, they are resistant to degradation and mineralization and have a tendency to build up in land fills. Under most conditions, hydrocarbon polymers take a long time to decompose. In addition, hydrocarbon polymers are not manufactured from renewable resources.

Hydrocarbons have been combined with starch in attempts at increasing degradability. Trash bags which incorporate starch can be physically degradable, which means that they become broken into many small parts as the starch biodegrades. The hydrocarbon component, however, remains resistant to degradation and mineralization. In certain circumstances, it is believed that the hydrocarbon component has a tendency to encapsulate the starch thereby preventing further biodegradation of the starch. Furthermore, materials incorporating large amounts of starch can be very sensitive to moisture and can have mechanical properties which vary considerably with humidity.

Attempts have been made at developing thermoplastic films having degradable properties. For example, U.S. Pat. No. 4,133,784 to Otey et al. describes degradable mulch films with improved moisture resistance prepared from starch and ethylene/acrylic acid copolymers. U.S. Pat. No. 5,091,262 to Knott et al. describes a multilayer polyethylene film containing a starch filled inner layer, and prodegradant filled outer layers. U.S. Pat. No. 5,108,807 to Tucker describes a multilayer thermoplastic film having a core layer made of polyvinyl alcohol, and outer layers made of polyethylene and prodegradant. U.S. Pat. No. 5,391,423 to Wnuk et al. describes multilayer films prepared from various biodegradable polymers for use in disposable absorbent products, such as diapers, incontinent pads, sanitary napkins, and pantyliners.

Many biodegradable polymers have been found to possess the desirable characteristics of biodegradability and compostability. At room temperature, however, many biodegradable polymers are either too brittle to provide the desired puncture and tear resistance necessary for commercially acceptable trash bags, or they do not have adequate stability for storage and transport. In addition, many biodegradable polymers are difficult to process into films using commercial manufacturing lines.

SUMMARY OF THE INVENTION

Compostable multilayer structures with desired properties of flexibility and tear resistance are provided by the present invention. The compostable multilayer structures are preferably in the form of films, sheets, laminates and the like. The compostable multilayer structures can be manufactured into disposable consumer products such as bags, wrappers, cups, and the like, which can degrade when subjected to composting conditions. Preferably, the multilayer structure is in the form of a film.

The compostable multilayer structures can be provided in various layered arrangements. A preferred compostable multilayer structure includes a core layer having a first surface and a second surface, a first blocking reducing layer covering the first surface of the core layer, and a second blocking reducing layer covering the second surface of the core layer. Preferably, the core layer has a glass transition temperature ($T_g$) below about 20° C., and at least one of the first and second blocking reducing layers includes a semicrystalline polymer composition and/or has a glass transition temperature above about 50° C.

Applicants discovered that certain desirable properties of compostable polymer compositions, such as flexibility, tear resistance, and puncture resistance, can be adjusted by controlling the glass transition temperature thereof. For example, for many compostable polymer compositions, such as hydrolyzable polymer compositions, reducing the ($T_g$) provides a layer having increased flexibility, tear resistance, and puncture resistance to commercially acceptable levels for bags and wrappers. In addition, Applicants discovered that certain polymers compositions can be used to provide blocking reducing layers when applied over the compostable polymer compositions having increased flexibility, tear resistance, and puncture resistance. As used in the context of the present invention, blocking occurs when polymer composition layers fuse or stick together. The extent of blocking is evaluated relative to the degree of fusion between the layers or tackiness of the layers. Many polymer compositions having low glass transition temperature have been found to possess increased incidence of blocking. Applicants discovered, however, that resistance to blocking can be adjusted by controlling the glass transition temperatures. For many compostable polymer compositions such as certain hydrolyzable polymer compositions, an increased glass transition temperature tends to reduce blocking. In addition, Applicants additionally discovered that controlling the crystallinity of a polymer composition can provide reduced blocking.

The layers of the compostable multilayer structures are preferably made of materials which are compostable, such as polymer compositions which include, for example, hydrolyzable polymers. Exemplary hydrolyzable polymers include copolymers and polymer blends of poly(trimethylene carbonate) and polyesters such as poly(lactic acid), poly(lactide), poly(glycolide), poly(hydroxy butyrate), poly(hydroxy butyrate-co-hydroxy valerate), poly(caprolactone), poly(ethylene-oxylate), poly(1,5-dioxepan 2-one), poly(1,4-dioxepan 2-one), poly(p-dioxanone), poly (delta-valerolactone), polyethylene(oxylate), polyethylene (succinate), polybutylene(oxalate), polybutylene(succinate), polypentamethyl(succinate), polyhexamethyl(succinate), polyheptamethyl(succinate), polyoctamethyl(succinate), polyethylene(succinate-co-adipate), polybutylene (succinate-co-adipate), polybutylene(oxylate-co-succinate), polybutylene(oxylate-co-adipate). Aliphatic polyesters which are preferred because of their ability to hydrolyze to generally biodegradable units. It should be appreciated that lactic acid residue containing polymers such as poly(lactide) and poly(lactic acid) are preferred hydrolyzable polymers because of their composting and biodegradable properties. Even more preferred are copolymers prepared from lactide or lactic acid and epoxidized multifunctional oil, such as soybean oil or linseed oil.

The polymers which can be used to provide the layers of the multilayer structure should have a molecular weight which is sufficient to provide a polymer composition having film or sheet forming properties. This means that the molecular weight should be sufficiently high so that the polymer composition can form a sheet or film having integrity, and that the molecular weight should not be too high that the polymer composition is too viscous and has problems forming a sheet or film using commercial film or sheet forming equipment. Moreover, it should be appreciated that the molecular weights of the polymers used to provide the various layers can be different, reflecting the desired properties of the individual layers. For example, the molecular weight of the polymer used to prepare the core layer should be sufficiently high to provide sufficient tear strength and puncture resistance, and the molecular weight of the polymers used to prepare the blocking reducing layers should be sufficient to provide the desired glass transition temperature.

Practically, it is believed that this generally corresponds with polymers having a number average molecular weight in the range of about 50,000 to about 200,000, and a weight average molecular weight in the range of about 100,000 to about 600,000. To provide sufficient flexibility and puncture and tear resistance, it has been found that the polymer used to prepare the core layer should have a number average molecular weight between about 80,000 and 200,000, more preferably between about 90,000 and 175,000, and even more preferably between about 100,000 and 150,000. The blocking reducing layers should have a number average molecular weight above about 50,000. As will be discussed in more detail, the selection of the molecular weight of the polymers used in the various layers can be adjusted to provide viscosity matching characteristics during, for example, coextrusion.

It is understood that the low glass transition temperature is responsible for providing the multilayer structure with desired flexibility and tear resistance. Accordingly, it is desirable to provide the glass transition temperature of the core layer below the temperatures at which the multilayer structure will be used. It has been found that for most conditions of use at room temperature, a $T_g$ below about 20° C. should be acceptable. At cooler conditions, it is preferred that the core layer should have a $T_g$ below about 5° C., and under more extreme conditions, a $T_g$ below about −10° C. would be preferred.

A preferred technique for reducing the glass transition temperature of the core layer is to incorporate therein an effective amount of plasticizers into the polymer composition which forms the core layer. Generally, this means that the plasticizer can be included to provide a concentration level of about 10 to 35 percent by weight, and more preferably a concentration level of about 12 to 30 percent by weight. It is preferred that the plasticizer is biodegradable, non-toxic, compatible with the resin, and relatively nonvolatile. Plasticizer in the general classes of alkyl or aliphatic esters, ether, and multi-functional esters and/or ethers are preferred.

When the core layer has a glass transition temperature below the temperature of use of the multilayer structure, it has been found that the core layer suffers from blocking. It should be appreciated that blocking occurs when polymer layers fuse together. The extent of blocking is a function of the degree that the layers fuse together. Layers which are highly blocked will be almost totally fused together. Blocking is a particularly undesirable property for certain articles such as bags and wrappers which are commonly stored in a roll or other arrangement where the layers are in contact.

Applicants have found that blocking can be reduced by the incorporation of blocking reducing layers in the compostable multilayer structure. Preferably, the blocking reducing layers are hydrolyzable polymers such as lactic acid residue containing polymers having a number average molecular weight above 50,000. If desired, the blocking reducing layers can include anti-blocking agents to reduce blocking. Exemplary anti-blocking agents include poly (hydroxy butyrate co hydroxy valerate), cellulose acetate, cellulose propionate, cellulose butyrate, cellulose acetate propionate, cellulose acetate butyrate, cellulose propionate butyrate, and mixtures thereof. The amount of anti-blocking agent should determined based upon its effect in reducing blocking.

In an alternative embodiment, the blocking reducing layer can include a polymer composition including a semicrystalline polymer which provides reduced blocking. Exemplary semicrystalline polymers include polyethylene (oxylate), polyethylene(succinate), polybutylene(oxalate), polybutylene(succinate), polypentamethyl(succinate), polyhexamethyl(succinate), polyheptamethyl(succinate), polyoctamethyl(succinate), polyethylene(succinate-co-adipate), polybutylene(succinate-co-adipate), polybutylene (oxylate-co-succinate), polybutylene(oxylate-co-adipate), or mixtures or copolymers thereof. It is generally preferred that the semicrystalline polymer has a crystallinity of greater than 10 J/g as determined by a differential scanning calorimeter. More preferably, the semicrystalline polymer has a crystallinity of greater than 30 J/g.

In an alternative embodiment of the present invention, the compostable multilayer structure can be provided as a two layer structure having a core layer and a blocking reducing layer. It is believed that this compostable multilayer structure can be stored in the form of a roll so that both sides of the core layer are adjacent a blocking reducing layer.

Methods for manufacturing compostable multilayer structures are provided by the present invention. A preferred method includes the step of coextruding layers of compostable polymer compositions to form a multilayer structure. The coextrusion step can be carried out by a variety of techniques. One technique involves combining the separate melt streams either in the die or by simultaneously casting. An alternative technique involves combining or casting two or more streams onto a substrate, such as paper or other form of web. The layers of the multilayer structure preferably include a core layer having a first surface and a second surface and a $T_g$ below about 20° C.; a first blocking reducing layer covering the first surface of the core layer, and having a $T_g$ above about 50° C.; and a second blocking reducing layer covering the second surface of the core layer, and having a $T_g$ above about 50° C.

The structure may be a film formed from an extruded melt by any of several means. The structure may be cast and quenched, either onto a drum, a belt, in water, or the like. The cast film may be subsequently oriented, either uniaxially or biaxially, using conventional equipment such as drawing on heated rollers or using a tenter-frame, or a combination thereof. The processing operation may also include crystallization (of the outer layers) and/or heat-setting of the film. The biaxially oriented film can also be subjected to additional drawing of the film in the machine direction, in a process known as tensilizing.

The film may also be processed in a blown-film apparatus, in order to achieve direct biaxial orientation directly from the melt or in a double-bubble process. The blown-film process is known in the art, as is the double-bubble process. In the blown film process the annular tube is inflated as it leaves the extruder and is cooled with an air ring, prior to collapsing and winding. The double-bubble process first quenches the tube, it is then reheated and oriented by inflating at a temperature above the $T_g$ but below the crystalline melting point (if the polymer is crystalline).

For lactic acid residue containing polymers based outer layers, the preferred temperature for orienting in the double bubble process is believed above the $T_g$ but below 90° C., and preferably below 75° C. If orientation occurs at a temperature which is too high, it may be difficult to obtain sufficient crystallinity, and the resulting polymer composition will not be resistant to blocking at temperatures greater than 50° C.

The film may also be subjected to rolling, calendaring, coating, embossing, printing, or any of the other typical finishing operations known in the art.

The core layer, with a $T_g$ less than 20° C. and (typically) amorphous, can be difficult to handle in pelletized form. A preferred method for preparing the core layer is to start with a polymer which has a $T_g$ greater than about 40° C. and inject the plasticizer into the extruder during the film forming process. This "on-line" plasticization is advantageous because it removes the need to pelletize and handle the low $T_g$ material.

Compostable multilayer sheets are provided by the present invention. The sheet has a thickness greater then 10 mils (0.010 inch). The sheet can be used as thermoformed rigid container, cups, tubs, dinnerware, etc. In most applications, it is understood that the sheet will have a thickness less than 150 mils.

A compostable film is provided by the present invention, wherein the compostable film includes a lactic acid residue containing polymer, and has a tear resistance of greater than 50 $gm_f$/mil at 23° C. according to ASTM D1922-89, and exhibiting substantially no blocking when folded back on itself and held together under a pressure of 180 g/in² at 50° C. for two hours, and preferably for 24 hours. Preferably, the film has a tear resistance of at least 65 $gm_f$/mil, and more preferably at least 80 $gm_f$/mil at 23° C. according to ASTM D1922-89.

DETAILED DESCRIPTION OF THE INVENTION

Figure 1:
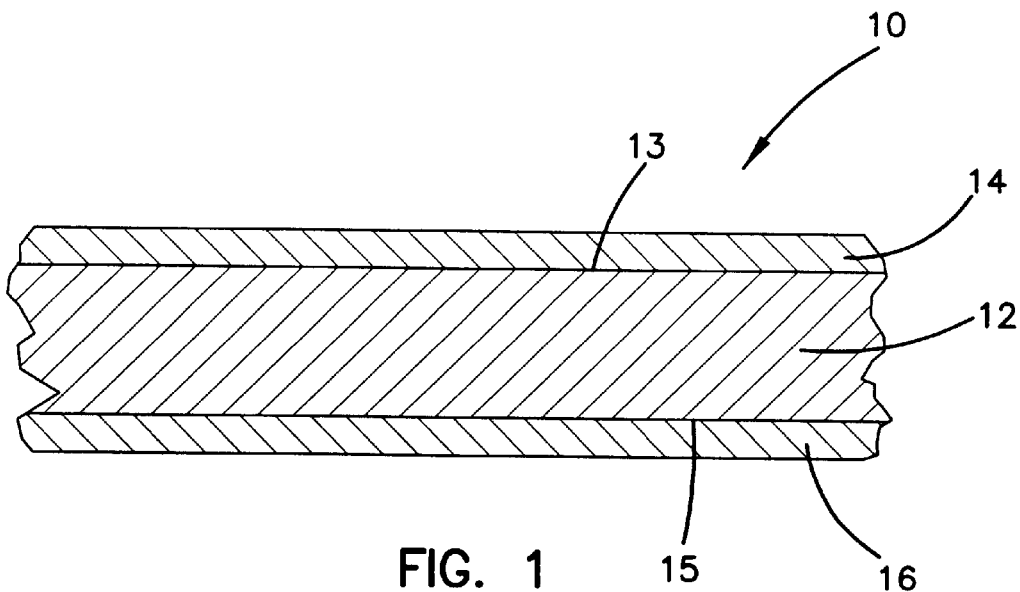
FIG. 1 is a cross-sectional view of a multilayer structure in the form of a film according to the principles of the present invention.

The present invention relates to a multilayer structure having compostable properties. This means that the multilayer structure will break down and become part of a compost upon being subjected to physical, chemical, thermal, and/or biological degradation in a solid waste composting or biogasification facility. As used in this application, a composting or biogasification facility has a specific environment which induces rapid or accelerated degradation. Generally, conditions which provide rapid or accelerated degradation, compared with storage or use conditions, are referred to herein as composting conditions. In the context of the present invention, the multilayer structure may be referred to as a compostable multilayer structure.

In order to provide a compostable multilayer structure, the components of the multilayer structure should be compostable and biodegradable during is composting/biogasification, or in compost amended soil, at a rate and/or extent comparable to that of known reference materials such as cellulose or paper. Basically, this means that the components should be degradable within a time frame in which products made therefrom, after use, can be recycled by composting and used as compost. It should be understood that certain materials such as hydrocarbons and other polymeric resins including polyethylenes, polypropylenes, polyvinyls, polystyrenes, polyvinyl chloride resins, urea formaldehyde resins, polyethylene terephthalate resins, polybutylene terephthalate resins, and the like are not considered compostable or biodegradable for purposes of this invention because they take too long to degrade when left alone in a composting environment.

It is preferred that as large a percentage as possible of the materials making up the multilayer structure should be compostable and biodegradable. Preferably, the materials can be chemically or biologically broken down, then mineralized by microorganisms in a biologically active environment to simple molecules, such as, carbon dioxide, methane, and water, leaving biomass and naturally occurring assimilation products. In assessing biodegradability, both the rate of biodegradation and the ultimate extent of biodegradation are important considerations. It is preferred that the rate of biodegradation and the extent of biodegradation of the materials used in the multilayer structure should be comparable to known reference materials such as cellulose or paper.

The rate and extent of biodegradation of the multilayer structure can be correlated to known biodegradable materials, such as kraft paper or cellulose, using ASTM D5338-92 Test Method for Determining Aerobic Biodegradation of Plastic Materials Under Controlled Composting Conditions. This is a laboratory test which compares the rate of biodegradation of a test sample to that of a known biodegradable material by determining the amount of $CO_2$ evolved from the compost with and without the test sample. A modified version of the ASTM D5338-92 test can be used to more conveniently approximate large scale composting conditions. This modified test is referred to as the first modified test and is performed according to ASTM D5338-92 except that a constant temperature of 58° C. is provided. The amount of material biodegraded is calculated based upon measuring the amount of carbon dioxide evolved therefrom. A second modified version of ASTM D5338-92 can be used to determine the degradation at soil conditions. The second modified test is carried out according to ASTM D5338-92 except that a temperature of 30° C. is used and the media is soil at approximately 70% of its moisture holding content (ASTM D 425).

Figure 3:
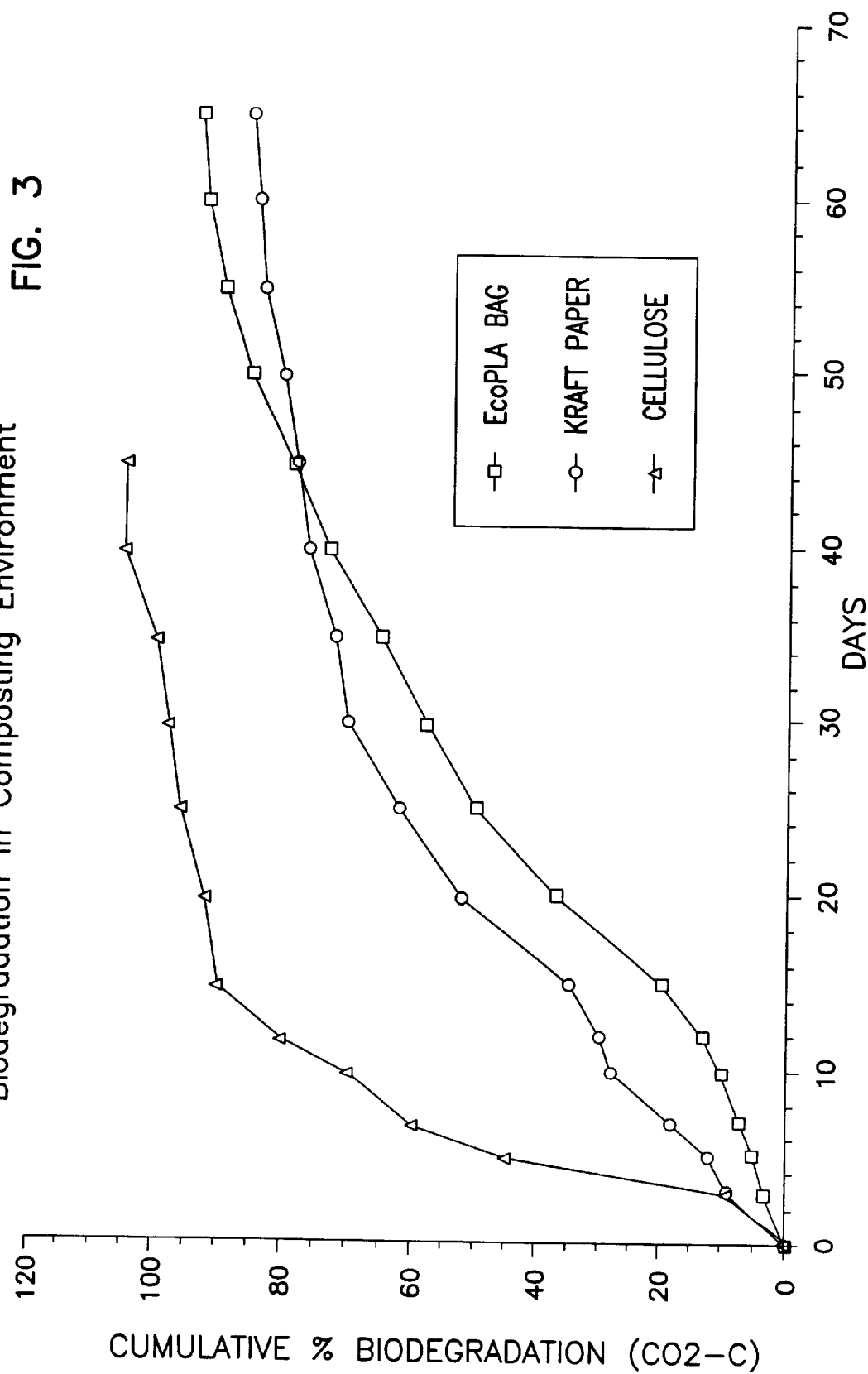
FIG. 3 is a graph comparing the rate of biodegradation of the multilayer film of Example 2, kraft paper, and cellulose.

Test results for biodegradation according to the first modified ASTM D5338-92 test are provided in FIG. 3 where the cumulative percent biodegradation (referred to as the biodegradation value) is measured as a function of time for the multilayer structure prepared in Example 2, kraft paper, and cellulose. The details of this test are described in Example 9. For the results plotted in FIG. 3, a biodegradation value of 70 percent at 40 days means that at least 70 percent of the carbon in the multilayer structure has been converted to carbon dioxide and microbial biomass after composting under conditions of the first modified test for 40 days. For most multilayer structures of the present invention, it is preferred that they have a biodegradation value of at least 50 percent after 40 days, and even more preferably at least 60 percent after 40 days. In addition, it is preferred that they possess a biodegradation value of at least about 70 percent after 60 days. For slower materials, biodegradation values of at least about 20 percent after 40 days and/or at least about 30 percent after 60 days can be provided.

Another way of characterizing the rate and extent of biodegradation of the multilayer structure of the invention is to compare it with the rate and extent of biodegradation of known compostable and biodegradable materials such as kraft paper and cellulose. Generally, it is desirable that the multilayer structure will have a biodegradation value which is at least about 50 percent, and more preferably at least about 60 percent, of the biodegradation value of kraft paper or cellulose after 40 days in a standard compost as provided in ASTM D5338-92.

In a preferred embodiment of the invention, the entire multilayer structure will eventually decompose under composting conditions. It should be appreciated, however, that practical composting conditions may terminate before the active stage of composting is complete. As a result, multilayer structures of the invention can then be placed in soil or otherwise disposed of before complete decomposition occurs. It is believed degradation of a multilayer structure which is not completely degraded after composting will continue at a slower rate when placed into soil.

It should be understood that the multilayer structure of the invention can include materials which are not compostable or biodegradable under short period composting conditions. Such materials can be incorporated to provide desired physical properties, such as barrier properties, and should be kept to a minimum since it is desirable to provide a multilayer structure having a high degree of degradability under composting conditions. Exemplary types of materials include thermoplastic resins, such as, hydrocarbons, polyesters, polyvinyl alcohols, poly(acrylonitrile) polymers, and select highly substituted cellulose esters. Exemplary hydrocarbons include polyethylene, polypropylene. Exemplary polyesters include aromatic polyesters, such as, polyethylene terephthalate (PET) and polybutylene terephthalate (PBT).

According to Example 9, the multilayer structure of Example 2 has a biodegradation value of about 90 percent after 60 days according to the modified ASTM D5338 test, conducted at a constant temperature of 58° C. It should be appreciated that the extent of crystallization in the lactic acid residue containing polymers can alter this value. It is believed that a more crystalline lactic acid residue containing polymer will generally biodegrade more slowly than a less crystalline lactic acid residue containing polymer.

The multilayer structure of the invention can be provided as films, sheets, laminates, and the like. Films can be used in applications such as disposable bags, wrappers, personal hygiene products, packaging materials, agricultural mulch films, and the like. Exemplary disposable bags include trash bags, sandwich or snack bags, grocery bags, waste bin liners, compost bags, food packaging bags and the like. Exemplary disposable wrappers include food wrappers such as fast food wrappers, food packaging films, blister pack wrappers, skin packaging and the like. Sheets can be used in applications including thermoformed rigid containers, cups, tubes, dinnerware, cup lids, deli trays and the like. Laminates include coated paper which can be used, for example, as boxes, multiwall bags, multiwall containers, spiral wound tubes (e.g., mailing tubes), and the like. In situations where the multilayer structure is in the form of a film or sheet, it may be desirable to ensure that the film or sheet possess the properties of tear resistance, quietness, and impact resistance. Transparent structures may also be of benefit for any packaging application, where it is desirable to see the package contents. The multilayer structure of the invention can also be prepared using coextrusion blow molding, to directly produce articles such as rigid containers, tube, bottles, and the like. For certain applications, such as, use in a compostable lawn refuse bag, it may be desirable to have the multilayer structure substantially transparent to visible light. This allows rapid determination of the contents before shipping to a compost facility, or identification of contents under a wrapper.

Applicants found that presently available biodegradable polymers do not generally possess desirable physical properties for use as single layer films or sheets because they have high glass transition temperatures, poor tear resistance structures which do not rapidly crystallize (if it has a low Tg), low melting point, or are difficult to process on conventional machines. These particular problems are often encountered when trying to process biodegradable polymers in conventional process equipment.

It is appreciated that certain hydrocarbons can be very useful for forming single layer bags because they have very low glass transition temperatures, crystallize quickly, have relatively high melting temperatures, and are easy to process. Polyethylene, for example, has a $T_g$ of $-100°$ C. and a $T_m$ of over 100° C. which makes it ideally suited for use in producing single layer trash bags.

The glass transition temperature of a polymer is considered too high for use as a single layer flexible film or flexible sheet if it is above the temperature at which the polymer will be used for a given application, which can be referred to herein as the ambient temperature ($T_a$). When the polymer is used at a $T_a$ which is lower than the $T_g$ of the polymer, the polymer will typically be too brittle which can result in cracking or fracturing of a layer formed therefrom. An example of a polymer having a $T_g$ which is too high for forming a single layer flexible film is linear polylactic acid polymer which has a $T_g$ of about 54° C.

It is understood that crystallinity is an important characteristic of a polymer and can be relied upon to reduce blocking. As discussed above, blocking occurs when films or other structures fuse together. It is a particularly undesirable property when it is exhibited by trash bags because it causes the sides of the bag to stick together, thereby preventing the bag from opening. It is believed that blocking is a function of the rate and extent of crystallization of a polymer. For example, it is understood that if the polymer crystallizes sufficiently quickly, it is believed that the tendency to block can be reduced. On the other hand, polymers which crystallize slowly will have a tendency to block in the process equipment when recently formed films or sheets are brought together causing them to fuse. An example of a polymer which does not crystallize sufficiently quickly under processing conditions is poly(caprolactone). It is believed, however, that for many polymers such as poly(caprolactone), processing conditions can be modified to reduce blocking. For example, it is believed that the double bubble blown film process can reduce blocking in poly(caprolactone) polymer compositions.

Some biodegradable polymers are not suitable for single layer bags because they have a melting point ($T_m$) which is too low. A low $T_m$ renders a polymer difficult to process, and requires cooling below its $T_m$ to induce crystallization. Several aliphatic polyesters have a $T_m$ which is too low. Also, if the storage or use temperature exceeds $T_m$ then the film will tend to fuse and lose integrity. An exemplary aliphatic polyester, such as polycaprolactone, requires a crystallization temperatures of room temperature or below which is difficult to achieve in most blown film or cast film facilities. Exemplary aliphatic polyesters having desirable $T_m$, but $T_g$ which is too high, include polyglycolide, polylactide, and poly(hydroxy butyrate).

Applicants have found ways to provide biodegradable polymer compositions having glass transition temperatures lower than ambient temperature. Various methods within the scope of the invention include providing blends of polymers or other additives, using copolymers, incorporating a plasticizer, and the like. These methods are discussed in more detail below. Although the resulting biodegradable polymer compositions have a glass transition temperature lower than ambient temperature, it has been observed that they can suffer from blocking when formed into a film or sheet. In order to overcome the blocking problem, Applicants discovered that certain biodegradable polymer compositions, such as, amorphous polymer compositions having a high $T_g$ or semi-crystalline polymer compositions, can be formed into thin layers and used as blocking reducing layers.

The Compostable Multilayer Structure

Now referring to FIG. 1, a preferred embodiment of the multilayer structure according to the present invention is shown at reference numeral 10 in the form of a film. The multilayer film 10 includes a core layer 12, a first blocking reducing layer 14, and a second blocking reducing layer 16. The first blocking reducing layer 14 covers the first surface 13 of the core layer 12, and the second blocking reducing layer 16 covers the second surface of the core layer 12. In the arrangement shown in FIG. 1, the core layer 12 is in contact with both the first blocking reducing layer 14 and the second blocking reducing layer 16. It should be understood, however, that for one layer to "cover" another layer, it is not necessary that the layers be in contact with each other. It should be appreciated that another layer or material can be placed therebetween. For example, a layer of adhesive, polymer, foil, or other material, such as paper, can be placed between the core layer and the blocking reducing layer. Various properties, such as, vapor resistance, chemical resistance, adhesion, tensile strength, and the like, can be provided by selecting layers in addition to those shown in the multilayer film 10.

It should be appreciated that the multilayer film can be provided without a second blocking reducing layer. The film could be stored in roll form so that the core layer contacts both sides of the blocking reducing layer. The film could then be unrolled prior to use, for example, as a wrapper or covering.

Figure 2:
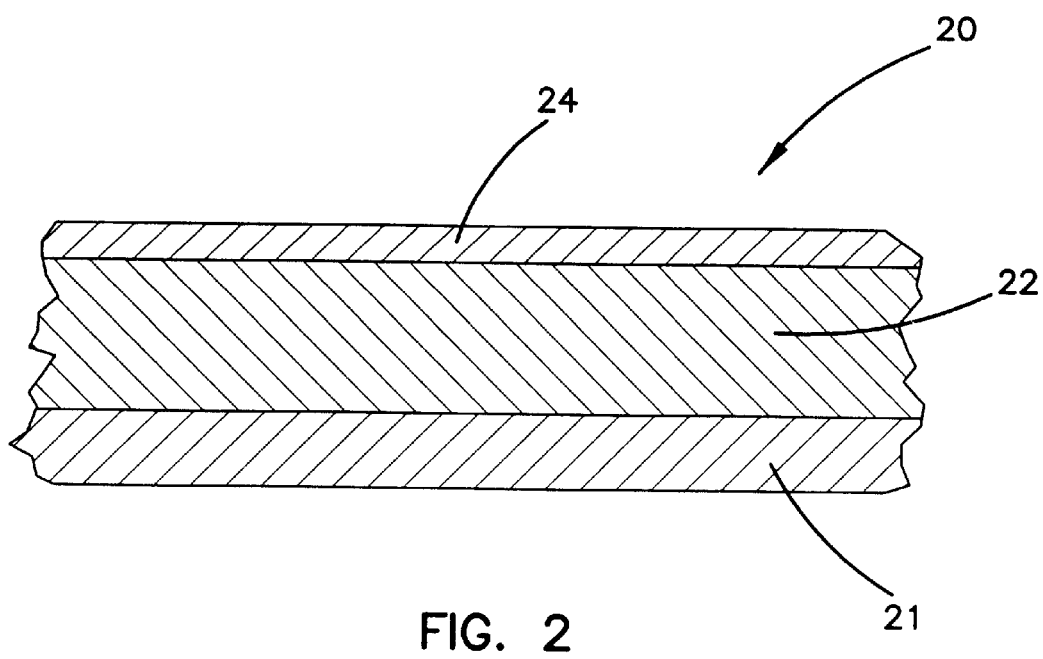
FIG. 2 is a cross-sectional view of an alternative embodiment of a multilayer structure in the form of a laminate having a paper substrate according to the principles of the present invention.

In an alternative embodiment of the invention shown in FIG. 2, a laminated paper product 20 is provided. The laminated paper product has a paper substrate 21, a core layer 22, and a blocking reducing layer 24 covering the core layer 22. It should be appreciated in this embodiment that the paper substrate 21 can also function as a blocking reducing layer.

The relative thickness of the core layer and the blocking reducing layers can be determined by taking a cross section and examining by optical microscopy. A second method would be to take a cross section and examine with an FTIR probe to determine composition across the profile. A third way is by measuring the flow rate of polymer streams into the multilayer die and calculating the resulting thicknesses. It is generally desirable for the blocking reducing layers to be as thin as possible to provide sufficient resistance to blocking and sufficient coverage over the core layer. In most structures, including films, sheets and laminates it is believed that the blocking reducing layers will be considered films, and may herein be referred to as films in the context of the present invention. It is understood that the core layer, generally, is primarily responsible for providing flexibility and tear and puncture resistance. Accordingly, it is usually preferred to maximize the core layer relative to the blocking reducing layers.

It should be appreciated that it would be desirable to recycle or use scrap or regrind recovered during the production of a multilayer structure in another multilayer structure. In some applications of the multilayer structure, such as thermoform operations, it is common for fairly large amounts of scrap or regrind to be generated. It is often preferred that the scrap or regrind can be remelted and used in the production of the core layer of another multilayer structure in order to keep the economics favorable. Accordingly, maintaining the blocking reducing layers as a small percentage of the overall composition will allow the scrap or regrind to be added back into the core layer composition with only minor effects on glass transition temperature.

For many applications where the blocking reducing layer is extruded, the thickness of the blocking reducing layer should be sufficient to provide a continuous layer and/or desired blocking resistance. It is believed that this usually corresponds with a lower limit of at least about 0.05 mil. If the thickness of the blocking reducing layer is much less than 0.05 mil, it has been found to be difficult to maintain a continuous coating. In most applications, it is believed that the thickness of the blocking reducing layers should be less than 0.5 mil, more preferably less than 0.3 mil, and even more preferably less than 0.1 mil. The core layer can be essentially any size so long as it provides the desired properties.

For most multilayer films, such as the one depicted in FIG. 1, it is believed that the total thickness of the film will usually be less than about 10 mil, and more preferably between about 1 mil and about 3 mils. Since it is desirable to keep the ratio of thicknesses of a blocking reducing layer to the overall thickness of the film as low as possible, the percentage of the blocking reducing layer to the overall thickness should be between about 5% and 25%. The percentage of the combined thickness of the blocking reducing layers to the overall thickness of the multilayer structure should be less than about 40%, and more preferably less than about 30%. Accordingly, at least about 60% of the thickness of the multilayer structure should be core layer, more preferably at least 70%.

It is believed that a multilayer sheet will have a thickness of at least about 10 mil or greater. Multilayer layer structures which include a paper layer or substrate can have a thickness, exclusive of paper substrate, of 0.5–3 mil. Generally, the thickness of the blocking reducing layers will have essentially the same values described above so long as they provide sufficient blocking resistance.

The Materials of the Multilayer Structure

The polymeric material which can be used in the multilayer structure is preferably a degradable polymer. A preferred type of degradable polymer is hydrolyzable polymers which can be characterized as being hydrolytically degradable. This means that chemical bonds in the molecule are subject to hydrolysis, thus producing smaller molecules. More preferably, the "hydrolyzable polymers" should additionally be "biodegradable" in a biologically active environment to simple molecules. It is preferred that the hydrolyzable polymers can be degraded by water at neutral pH, with cleavage of polymer linkages. Lactic acid residue containing polymers such as poly(lactic acid) polymers and polylactide polymers are preferred hydrolyzable polymers because they generally hydrolyze to lactic acid. The hydrolysis of lactic acid residue containing polymers can be manifested by a decrease in molecular weight as the molecules break down, and by a "weight loss" as water soluble lactic acid is formed.

The hydrolyzable properties of polymers can be evaluated by placing a sample of the polymer in an aqueous bath buffered to a pH of 7.4 with a phosphate buffer and maintained at a temperature of 75° C. For the purposes of this application, if the polymer is hydrolyzable, it will show significant drop in molecular weight within 3 days, and some weight loss within 14 days. For polymers which are water insoluble, the percent of the polymer considered hydrolyzable is the percent of initially insoluble material which is lost from the sample in 50 days. By this definition, many lactic acid residue containing polymers are 100% hydrolyzable. The crystallinity of a polymer, however, can effect its hydrolyzable properties. More crystalline polymers generally take longer to hydrolyze.

The hydrolyzability test for samples containing water soluble polymers would be modified to recover the solubilized material and determine its molecular weight. The fraction of material with molecular weight equal to or less than the expected monomeric degradation product would be considered to have been hydrolyzed.

Exemplary types of hydrolyzable polymers include poly (trimethylene carbonate) and polyesters such as poly (lactide), poly(lactic acid), poly(glycolide), poly(hydroxy butyrate), poly(hydroxy butyrate-co-hydroxy valerate), poly (caprolactone), poly(1,5-dioxepan 2-one), poly(1,4-dioxepan 2-one), poly(p-dioxanone), poly(delta-valerolactone), and other polyesters such as those containing residues of $C_2$–$C_{10}$ diols, and terephthalic acid, and the like. The polymers can be copolymers and polymer blends of the above polymers. Preferred polyesters are generally aliphatic polyesters which hydrolyze to biodegradable units.

Lactic acid residue containing polymers are particularly preferred for use in the present invention due to their hydrolyzable and biodegradable nature. One theory of the degradation of lactic acid residue containing polymers is that they can be degraded by hydrolysis at hydrolyzable groups to lactic acid molecules which are subject to enzymatic decomposition by a wide variety of microorganisms. It should be appreciated, however, that the precise mechanism of degradation is not a critical feature of the present invention. Rather, it is sufficient that one recognizes that polymers which provide similarly rapid degradation to naturally occurring end products can be useful in the present invention. U.S. Pat. No. 5,142,023 issued to Gruber et al. on Aug. 25, 1992, the disclosure of which is hereby incorporated by reference, discloses, generally, a continuous process for the manufacture of lactide polymers from lactic acid. Related processes for generating purified lactide and creating polymers therefrom are disclosed in U.S. Pat. Nos. 5,247,058; 5,247,059; and 5,274,073 issued to Gruber et al., the disclosures of which are hereby incorporated by reference. It should be appreciated that selected polymers from these patents having the physical properties suitable for use in the present invention can be utilized. Generally, polymers according to U.S. Pat. No. 5,338,822 issued to Gruber et al. on Aug. 16, 1994 and U.S. patent application Ser. No. 08/279,732, filed on Jul. 27, 1994, which are incorporated by reference, can be used in the present invention. Exemplary lactic acid residue containing polymers which can be used are described in U.S. Pat. Nos. 5,142,023; 5,274,059; 5,274,073; 5,258,488; 5,357,035; 5,338,822; and 5,359,026, to Gruber et al., and U.S patent application Ser. Nos. 08/110,424; 08/110,394; and 08/279,732, the disclosures of which are incorporated herein by reference. Polylactide polymers which can be used in the invention are available under the tradename EcoPLA™.

By now it should be appreciated that the term lactic acid residue containing polymer includes polymers containing about 50%, by weight, or more lactic acid residue units which, under certain conditions, will hydrolyze to lactic acid or derivative thereof. The remaining components of the lactic acid residue containing polymers can include non-lactic acid residues. Preferably, the lactic acid residue containing polymer is least about 70%, and more preferably at least about 90%, lactic acid residue. In a preferred embodiment, the lactic acid residue containing polymer contains less than about 2%, by weight, non-lactic acid residue.

Lactic acid residue containing polymers are generally prepared from monomers which include lactic acid, lactide, or combination thereof. It should be understood that other structural units which, when polymerized, have a structure similar to polymerized lactic acid or lactide can be used. Rather than focusing on how the lactic acid residue containing polymers are prepared, it should be understood that what is important is that the lactic acid residue containing polymers have characteristics which render them susceptible to hydrolysis and thereby enhance degradability or biodegradability. It is these characteristics which are important rather than the strict chemical composition of the polymer. However, polymers which are considered lactic acid residue containing polymers include poly(lactide) polymers, poly (lactic acid) polymers, and copolymers such as random and/or block copolymers of lactide and/or lactic acid. Lactic acid components which can be used to form the lactic acid residue containing polymers include L-lactic acid and D-lactic acid. Lactide components which can be used to form the lactic acid residue containing polymers include L-lactide, D-lactide, and meso-lactide.

A particularly preferred type of polylactide polymer includes viscosity modified polylactide which is described in detail in U.S. Pat. No. 5,359,026 and U.S. patent application Ser. No. 08/279,732, filed by Gruber et al. on Jul. 27, 1994, U.S. Pat. No. 5,594,095, entitled "Viscosity-Modified Lactide Polymer Composition And Process For Manufacture Thereof," the application being incorporated by reference. Viscosity modified polylactide polymers are important because they provide desirable processing characteristics such as reduced viscosity, increased melt strength, and hence improved bubble stability.

The viscosity modified polylactide polymers which can be used in the present invention have increased molecular interaction among the polymer chains. The increased molecular interaction being provided by, for example, providing bridging in the polylactide polymer, providing branching with the polylactide polymer, and increasing the weight average molecular weight of the polylactide. The "bridging" refers to providing bonding between long polymer polylactide-based chains. This can be accomplished by using free radical generating peroxides to cleave substituents from the polylactide backbones thereby generating polymer radicals that can bond with other polymer radicals, or by reaction of multifunctional chain extenders to link polymer chains together. The "branching" refers to providing pendent groups from linear polylactide-based polymer chains or providing long polymer segments joined to one another through a residue. This can be accomplished by introducing an initiator into the lactide reactants, by using a non-initiating agent such as an epoxidized hydrocarbon or an epoxidized oil, or by copolymerizing with molecules containing at least two cyclic ester rings.

Particularly preferred viscosity modified polylactide polymers include copolymers of lactide and epoxidized multifunctional oil such as epoxidized linseed oil and epoxidized soybean oil. In many situations, it is preferred that the polymer is prepared from 0.1 to 0.5 weight percent epoxidized multifunctional oil and molten lactide monomer. Catalyst can be added, and the mixture can be polymerized between about 160° C. and 200° C. The resulting polymer preferably has a number average molecular weight of about 80,000 to about 140,000.

It should be appreciated that lactic acid residue containing polymers are sensitive to high temperatures which creates processing and storage life problems if not adequately addressed. U.S. Pat. No. 5,338,822 describes how lactic acid residue containing polymer stability can be provided during melt processing.

As discussed above, many biodegradable polymers such as non-plasticized polylactic acid polymers are generally too brittle for use as single layer flexible films and/or sheets. Their $T_g$ is generally above 50° C., and it has been observed that they provide a film or sheet having low impact resistance and tear resistance. Tear resistance of a typical polylactide film having a $T_g$ above 50° C. is less than about 6 gm$_f$/mil. Other biodegradable polymers, including certain aliphatic polyesters, exhibit poor tear strength. These physical properties render films or sheets prepared therefrom poor candidates for use as bags or wrappers. Articles such as trash bags, grocery bags, food wrappings, and the like should be flexible and resistant to tearing and puncturing.

Applicants discovered that by lowering the glass transition temperature ($T_g$) of biodegradable polymers to about 20° C. or less, it is possible to provide a film or sheet having improved flexibility and tear and puncture resistance. More preferably, it is desirable to lower the $T_g$ to below about 5° C., and more preferably below about minus 10° C. These glass transition temperature should be below the temperature at which the polymer is used. When the biodegradable polymer is a lactic acid residue containing polymer, a preferred method for lowering the glass transition temperature ($T_g$) is by adding plasticizer thereto. As demonstrated in Example 1, plasticizer can be added to a polylactide polymer to lower the glass transition temperature ($T_g$) from 60° C., without plasticizer, to 19° C. at a level of 20 percent, by weight, plasticizer.

For most lactic acid residue containing polymers, it is believed that the glass transition temperature can be lowered to desirable levels by adding a plasticizer component to provide a concentration of about 1 to 40 percent by weight plasticizer, based on the weight of the polymer composition. Generally, a sufficient amount of plasticizer should be incorporated to provide a desired reduction in $T_g$ and increase flexibility and tear strength. It is believed that the plasticizer level should be above at least 8 percent by weight, and more preferably above at least 10 percent by weight, to provide sufficient flexibility and tear resistance. The upper limit on plasticizer can be controlled by other considerations such as loss of film or sheet integrity if too much plasticizer is used. Furthermore, too high a concentration of plasticizer will promote migration of plasticizer into the outer layer. Accordingly, the plasticizer should be included to provide a concentration level of about 10 to 35 percent by weight, preferably a concentration level of about 12 to 30 percent by weight, and more preferably a concentration level of about 20 to 35 percent by weight.

The selection of the plasticizer can involve consideration of several criteria. Since it is generally desirable to provide as much biodegradability as possible, it is preferred to use a plasticizer which is biodegradable, non-toxic, compatible with the resin, and relatively nonvolatile. Plasticizer in the general classes of alkyl or aliphatic esters, ether, and multi-functional esters and/or ethers are preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Preferred plasticizer are tricarboxylic esters, citrate esters, esters of glycerine and dicarboxylic esters. More preferably, citrate esters are preferred since it is believed that these esters are biodegradable. These plasticizer can be obtained under the names Citroflex A-4®, Citroflex A-2®, Citroflex C-4®, Citroflex C-4® (from Morflex).

It should be appreciated that plasticizer containing aromatic functionality or halogens are less preferred because of their possible negative impact on the environment. For example, appropriate non-toxic character is exhibited by triethyl citrate, acetyltriethyl citrate, tri-n-butyl citrate, acetyltri-n-butyl citrate, acetyltri-n-hexyl citrate, n-butyltri-n-hexyl citrate and acetyltriethyl citrate, tri-n-butyl citrate, diisobutyl adipate, diethylene glycol dibenzoate, and dipropylene glycol dibenzoate. Appropriate compatibility is exhibited by acetyltri-n-butyl citrate, acetyltriethyl citrate, tri-n-butyl citrate, diisobutyl adipate, diethylene glycol dibenzoate, and dipropylene glycol dibenzoate. Other compatible plasticizers include any plasticizer or combination of plasticizer which can be blended with lactic acid residue containing polymer and are either miscible therewith or which form a mechanically stable blend.

Volatility is determined by the vapor pressure of the plasticizer. An appropriate plasticizer should be sufficiently non-volatile such that the plasticizer stays substantially in the composition throughout the process needed to produce the multilayer structure, and to provide desired properties when the structure is used. Excessive volatility can lead to fouling of process equipment, and can result in undesired plasticizer migration. Preferred plasticizer should have a vapor pressure of less than about 10 mm Hg at 170° C., and more preferred plasticizer should have a vapor pressure of less than 10 mm Hg at 200° C.

Internal plasticizer, which are bonded to the lactic acid residue containing polymer, may also be useful in the present invention. Exemplary plasticizer which can be bonded to the polymer include epoxides.

Although plasticized lactic acid residue containing polymers can provide desired tear strength, they have shown severe blocking which makes them unsuitable as single layer bags or wrappers. It should be understood that "blocking" is meant to describe the tendency of one layer of a structure to entangle, enmesh or stick to another layer. Thus, two layers exhibiting high blocking are not easily separated to form, for example, a bag. Applicants have found that while reducing the $T_g$ of lactic acid residue containing polymers enhances flexibility and tear strength, it also increases or promotes blocking. This feature is demonstrated by the data in Table 1 in Example 1.

Applicants have tried several methods to reduce the blocking of a single layer plasticized lactic acid residue containing polymer film. One method which reduced the blocking tendency was to crystallize the lactic acid residue containing polymer film. Unfortunately, the crystallized film lost desirable properties, such as tear resistance, making this method unsatisfactory. Applicants also tried compounding the polymer with conventional organic or inorganic fillers, such as diatomaceous earth. When used with a plasticized polylactide composition, this technique produced results which initially appeared favorable and produced a film with good bubble stability and no initial blocking. However, after a short storage period, the films began to fuse or block.

Applicants found that multilayer structures could be created which were relatively resistant to blocking over time and which retained the desirable properties of a plasticized lactic acid residue containing polymer composition, such as, elongation and tear resistance. The blocking was reduced by incorporating blocking reducing layers which cover the core layer of plasticized lactic acid residue containing polymer. The blocking reducing layers could have a variety of compositions, provided that they reduce blocking.

The Blocking Reducing Layer

Five preferred types of compositions for forming the blocking reducing layers are described below. A preferred first composition for preparing the blocking reducing layer includes amorphous lactic acid residue containing polymer having a $T_g$ above 50° C. It is believed that the high glass transition temperature of the amorphous lactic acid residue containing polymer is responsible for reducing or preventing blocking. Thus, blocking can be reduced provided that the ambient or use temperature is below the $T_g$ of the blocking reducing layer. It is believed that at temperatures below the $T_g$ of the polymer, the molecules in the polymer are not sufficiently mobile to cause blocking.

A preferred second composition which can be used for preparing the blocking reducing layer includes semicrystalline lactic acid residue containing polymer. A semicrystalline lactic acid residue containing polymer will generally have an optical purity of greater than 85% either R or S lactic acid residues, although the overall composition can be less optically pure if the polymer is a block copolymer, rather than random. The semicrystalline lactic acid residue containing polymer provides blocking resistance to higher temperatures than the amorphous lactic acid residue containing polymer, with no blocking observed even at temperature of 90° C.

A preferred third composition which can be used for preparing the blocking reducing layer includes lactic acid residue containing polymer and a high glass transition temperature polymeric additive for reducing blocking. Preferred high $T_g$ polymeric additives include polymers with a $T_g$ greater than about 50° C., and more preferably greater than about 90° C. The most preferred high $T_g$ polymeric additives are biodegradable and derived from renewable resources. Exemplary preferred high $T_g$ polymeric additives include cellulose acetate, cellulose propionate, cellulose butyrate, cellulose acetate propionate, cellulose acetate butyrate, cellulose propionate butyrate, terpene resins and rosin and rosin esters derived from tree sap.

A preferred fourth composition which can be used for preparing the blocking reducing layer includes a lactic acid residue containing polymer and a semicrystalline polymeric additive. Preferred semicrystalline polymeric additives will have a melting point above 90° C. and more preferably above 120° C. The most preferred semicrystalline polymeric additives are biodegradable and derived from renewable resources. Preferred semicrystalline polymeric additives include aliphatic polyester with melting points above 90° C. Exemplary preferred semicrystalline polymeric additives include poly(hydroxy butyrate), poly(hydroxy butyrate-co-hydroxy valerate), polybutylene(succinate), polybutylene (succinate-adipate copolymer), polyethylene(succinate), and polyethylene(succinate-adipate copolymer). It is believed that poly(glycolide), poly(lactide), or the stereocomplex of poly(L-lactide) and poly(D-lactide) might also be suitable for use as antiblocking agents.

It is understood that the semicrystalline polymeric additives should be present in an amount of between about 5–70% by weight of blocking reducing layer, more preferably between about 10 and 50% by weight. In the case of additive such as polyhydroxybutyrate (PHB) polymers and polyhydroxy butyrate/valerate copolymers (PHBV), it is preferred that they be present in an amount of about 100 by weight of blocking reducing layer.

Examples of polyhydroxybutyrate (PHB) polymers and polyhydroxy butyrate/valerate copolymers (PHBV) are described in U.S. Pat. No. 4,393,167, Holmes et al., issued Jul. 12, 1983, and U.S. Pat. No. 4,880,592, Martini et al., issued Nov. 14, 1989, and U.S. Pat. No. 5,391,423, Wnuk et al., issued Feb. 21, 1995, these patents being incorporated herein by reference. Polyhydroxy butyrate/valerate copolymers are commercial available from Ceneca Corp. under the tradename Biopol™. The Biopol polymers are produced from the fermentation of sugar by the bacterium *Alcilagenes eutrophus*. PHBV polymers are currently produced with valerate contents ranging from about 5 to about 25 mole percent. Increasing valerate content decreases the melting point, crystallinity, and stiffness of the polymer. An overview of Biopol technology is provided in Business 2000+, (Winter 1990), incorporated herein by reference.

Examples of polymers of polybutylene(succinate), polybutylene(succinate-adipate copolymer), polyethylene (succinate), and polyethylene(succinate-adipate copolymer) are available under the name Bionolle® from Showa High-polymer Co., Ltd.

Without being bound by theory, it is believed that the limited compatibility of the anti-blocking agent in the blocking reducing layer may be partly responsible for enhancing the anti-blocking characteristics thereof.

A preferred fifth composition which can be used for preparing the blocking reducing layer includes a rapidly crystallizable polymer having a high melting temperature ($T_m$). Preferably, it also exhibits a low glass transition temperature ($T_g$). It is believed that the rapid crystallization will facilitate processing by reducing or preventing sticking and blocking during film handling.

Polymer compositions having a low $T_g$ and high $T_m$ are desirable because they can provide rapid crystallization after processing. Typically, in order for a polymer composition to exhibit rapid crystallization, it needs to be well below its $T_m$. Under normal processing condition, the polymer composition should therefore have a $T_m$ above about 80° C. and below about 200° C., and preferably below about 170° C. A $T_m$ of 80° C. is believed to be high enough so that a polymer can crystallize during typical blown film production. A $T_m$ of 80° C. or higher will also provide excellent blocking performance under typical use and storage conditions. The upper limit on the $T_m$ is determined by providing a composition which can be readily processable in line with a biodegradable polymer such as a lactic acid based polymer. Polymer compositions having a $T_m$ above 200° C. generally require processing conditions which make it difficult to provide on the same line as, for example, a plasticized polylactide polymer, even with the use of a multilayer die with distinct heating sections.

The glass transition temperature of the polymer composition should be relatively low in order to provide desired performance under certain applications. For example, a low glass transition temperature is particularly important for use in outdoor applications, such as lawn and leaf disposal bags. It has been observed that a low $T_g$ in the outer layer can help to strengthen the bag properties which otherwise are born entirely by the core layer. In most applications, the $T_g$ should be below about 10° C., and preferably below 0° C., and more preferably below −10° C.

In the present invention, a polymer composition layer is considered to be semicrystalline it if exhibits a net melting endotherm of greater than 10 J/g of polymer when analyzed by a different scanning calorimeter (DSC). To determine whether a polymer composition layer is semi-crystalline, it can be tested in a differential scanning calorimeter, such as by Mettler. The details of performing a test of crystallinity are known to those skilled in the art and are identified in U.S. patent application Ser. No. 08/110,394, filed on Aug. 23, 1993, the complete disclosure being incorporated herein by reference.

The extent of crystallinity should be sufficient to provide an outer layer having a crystallinity of at least about 10 J/g based on the weight of the outer layer only, or roughly 3 J/g based on the weight of the film having a layered cross-section of 15/70/15 by weight of each layer. This is believed to be sufficient to give excellent blocking resistance. Preferably, the crystallinity of the outer layer can be greater than 30 J/g. In most applications, the crystallinity of the outer layer will be less than 100 J/g.

While not being bound by theory, it is believed that the most preferred fifth composition will exhibit physical compatibility with the core layer but will not exhibit thermodynamic miscibility. Thus, a blend of core layer and outer layer may exhibit two glass transition temperatures, each being approximately equal to the glass transition temperature of each of the individual compositions. The low $T_g$ of the preferred outer layer compositions would be an indicator that the structure is significantly different than poly(lactide), making thermodynamic miscibility less likely. Typically, the low $T_g$ materials will have a higher proportion of —CH2— units in the backbone than will poly(lactide). The difference in structure is used to advantage by selecting a plasticizer for the core layer which is more compatible with poly(lactide) than with the outer layer polymer. This acts to keep the plasticizer in the polymer core layer, preventing migration of plasticizer. Migration of the plasticizer into the outer layer is undesirable because it raises the $T_g$ of the core layer, reducing low temperature performance, and because it can lead to "oily" surfaces which are a detraction to product acceptance. It is believed that crystallization of the outer layer is also beneficial for reducing the migration of plasticizer.

The physical compatibility is preferred so that the layers will form a reasonable bond at the interface, without having to result to costly "tie" layers with their added complexity. Physical compatibility is a more qualitative judgment, but typically physical compatibility is observed by lack of macroscopic phase separation, lack of a "cheesy" texture, and by tensile properties (such as tensile stress at break, tensile stress at yield, and elongation at yield) which are at least as good for the blend as they are for the minimum of each of the two pure components. A blend, such as 50/50 by weight, will exhibit tensile properties which are higher than the lower of the two pure components. Physical compatibility is a complex function of molecular weight and chemical structure, but will occur if two polymers are not too dissimilar. Aliphatic polyesters, and copolymers of aliphatic polyesters with other components, are expected to exhibit a certain degree of physical compatibility. An estimate of the minimum ester content to achieve physical compatibility is to have at least one ester group per 200 AMU of polymer unit.

The preferred polymers to meet these criteria are generally based on aliphatic polyesters, produced either from ring opening reactions or from the condensation of acids and alcohols. Typically, diols and diacids are reacted to form an aliphatic polyester by condensation polymerization. Often this limits the potential molecular weight to a number average molecular weight of less than 30,000, although, in some case, it may be as high as 50,000. To achieve higher molecular weights is generally very difficult. This molecular weight limit tends to result in polymers with poor tear strength, which is a critical property for film bag applications. Thus, these polymers, on their own, may have insufficient tear strength for a commercially acceptable film bag.

Aliphatic polyesters based on diacids and diols are available commercially and are generally preferred. The aliphatic polyesters with an even number of carbons in the diacid generally have a more crystalline nature than those with an odd number of carbons. The preferred aliphatic polyesters comprise the reaction products of a $C_2$–$C_{10}$ diol with oxalic acid, succinic acid, adipic acid, suberic acid, sebacic acid, or mixtures and copolymers thereof. More preferred polyesters include polyethylene(oxalate), polyethylene(succinate), polybutylene(oxalate), polybutylene(succinate), polypentamethyl(succinate), polyhexamethyl(succinate), polyheptamethyl(succinate), or polyoctamethyl(succinate), mixtures or copolymers thereof, or copolymers of these with adipic acid. Especially preferred are polyethylene (succinate), polyethylene(succinate-co-adipate), polytubylene(oxylate), polybutylene(succinate), polybutylene(succinate-co-adipate), polybutylene(oxylate-co-succinate and/or adipate), and mixtures thereof. The polybutylene terminology in this case refers to the condensation product of 1,4 butane diol and polyethylene terminology refers to the condensation product of 1,2 ethan diol, also know as ethylene glycol. To ensure reasonable rates of crystallization and sufficiently high Tm, it is anticipated that any copolymers will contain at least 70 mole % of the primary diacid (on a diacid basis). The aliphatic polyesters may also contain units derived from non-aliphatic diacids, or esters, such as terephthalic acid or methyl terephthalate. The condensation products of diacids with polyether diols may also be useful as outer layers in the multilayer film application.

An exemplary preferred polymer is a polybutylene succinate homopolymer sold under tradename Bionelle 1000™ and is available from Showa Highpolymer Co., Ltd. It is believed that polybutylene(succinate-terephthalate copolymer) and polybutylene(adipate-terephthalate copolymer) will be useful in forming the blocking reducing layer.

The Core Layer

In a preferred composition, the core layer will have a $T_g$ below 20° C. and more preferably below 10° C. IN the case of a core layer containing a polymer composition including a lactic acid residue containing polymer, reduced $T_g$ can be provided by a plasticizer level of about of 20 wt-% or more. Furthermore, when the polymer composition includes a lactic acid residue containing polymer, it is preferred that the lactic acid residue containing polymer be non-crystallizable compositions such as those described in U.S. patent application Ser. Nos. 08/110,424 and 08/110,394, filed on Aug. 23, 1993, U.S. Pat. Nos. 5,84,881 and 5,536,807 respectively, the entire disclosures being incorporated herein by reference. Generally, this means at least 15% of the minor otpical isomer of lactic acid residue is present. Alternatively, this means that the lactic acid residues are present in an optical purity of no more than 85%.

Applicants believe that it may be possible to modify the core layer with a blocking reducing modifier to reduce migration of plasticizer and thereby reduce blocking. An exemplary blocking reducing modifier is peroxide. Example 5 demonstrates the use of a peroxide blocking reducing modifier in a PLA and plasticizer composition. Without being bound by theory, it is believed that the blocking reducing modifier functions by modifying the core layer, possibly by reaction, so as to discourage plasticizer migration out of the core layer. It is believed that the blocking reducing modifier may bond the plasticizer to the core layer. In the case where peroxide is used as the blocking reducing modifier, it is preferably provided at a concentration of about 0.05 to about 0.5 percent by weight.

The core layer of the multilayer structure should be sufficiently flexible to be rolled or folded for packaging, to be useful for purpose intended. Preferably, the first layer should have sufficient flexibility to allow it to be folded over onto itself without cracking at the crease. It is preferred that a multilayer film according to the present invention would have a tensile modulus of less than 75,000 psi at 23° C. when tested according to ASTM D-882 method A-3.

Pigments or color agents may also be added as necessary. Examples include titanium dioxide, clays, calcium carbonate, talc, mica, silica, silicates, iron oxides and hydroxides, carbon black and magnesium oxide.

Applicants have found that the presence of residual catalysts in the lactic acid residue containing polymer structure significantly affects the stability thereof during processing. Accordingly, the catalyst level can be controlled as described in U.S. Pat. No. 5,338,822, which is incorporated herein by reference.

Forming the Multilayer Structure

The multilayer structure of the present invention can be manufactured by a variety of techniques, including coextruding blown or cast film. The preferred technique is coextrusion of blown film where all layers are extruded concurrently and are applied to each other either soon before or soon after they leave the co-extrusion die. A second preferred technique is coextrusion blow molding, for the production of articles. These techniques allow all the layers of the multilayer structure to be simultaneously extruded, stretched and combined. Other processing techniques used to prepare films, sheets, laminates and the like can be used in the present invention. Many techniques are described, for example, in *Encyclopedia Of Polymer Science And Engineering,* 2nd Edition, John Wiley and Sons, 1986, which is incorporated herein by reference.

As demonstrated by Example 4, it is important to match the viscosity of each layer in order to provide a structure wherein having a maximum thickness of the flexible core layer relative to the blocking reducing layers. Maximizing the core layer is believed to provide a maximum tear strength. In addition, it is believed that viscosity matching increases the compatibility between the layers. Viscosity matching can be accomplished by a variety of techniques including modifying the temperature of the die or individual polymer melt streams and/or altering the composition of the extrusion material.

When preparing the multilayer structure by blown film coextrusion or coextrusion blow molding, it may be desirable to inject the plasticizer into the polymer composition which forms the core layer while it is in the extruder. This avoid having to handle pellets having a low $T_g$ which would tend to stick together.

It should be appreciated how the orientation of the layers can be modified to provide desired physical properties. For example, the physical properties of a multilayer film prepared by blown film coextrusion can be altered by adjusting the blow-up-ratio (BUR) which is defined as the ratio of the diameter of the film bubble to the die diameter. For purposes of providing a bag or wrapper, it is typically desirable to provide a BUR of between about 1 and 5, and should be determined based upon the desired balance of properties in the machine direction and the tensile direction. For a balanced multilayer film, a preferred BUR of about 3:1 is appropriate. It is recognized that it may be desirable to have a "splitty" film which easily tears in one direction such as the machine direction. It is expected that a BUR of about 1:1 to 1.5:1 should provide such a multilayer structure.

As demonstrated by the data in Example 8, it is understood that migration of plasticizer from the core layer into the blocking reducing layers can be minimal over time. Without being bound by theory, Applicants hypothesize that plasticizer begins migrating into the outer/non-plasticizer containing layers, and that the presence of plasticizer allows the interfaces between the core layer and the non-plasticizer containing layers to crystallize which discourages or retards further migration of plasticizer. It is believed that by inducing crystallization at the interface, or in the boundary area in the non-plasticizer containing layers, properties including vapor and moisture diffusion can be altered.

Barrier properties, such as oxygen and water permeability, can also be affected by crystallizing and/or orienting the film. If the desired permeability cannot be achieved through processing, then a layer of additional polymer may be introduced to provide the desired barrier properties. For example, a thin layer of polyethylene, polypropylene, polyethylene terephthalate (PET), or other polymer with a water permeability of less than about 5 g-mil/100 in$^2$-day, could be added to reduce the water permeability of a lactic acid residue containing polymer based film. It has been found that the moisture vapor transmission rate for a multilayer film, such as in Example 2, is about 25 g-mil/100 in$^2$-day.

The oxygen permeability of lactic acid residue containing polymer based films has not been reported, but it is estimated to be about $2 \times 10^{-11}$ cc-cm/(cm$^2$-sec-cm Hg). A thin layer of PVOH, EVOH, PAN, or other polymer with oxygen permeability of less than about $2 \times 10^{-12}$ cc-cm//(cm$^2$-sec-cmHg) could be added to reduce the oxygen permeability of a lactic acid residue containing polymer based film.

EXAMPLES

Example 1

Example Showing Inverse Relationship Between Tear Resistance and Blocking Resistance and Direct Relationship Between Plasticizer Level and $T_g$ A Leistritz 34 mm twin screw extruder was used to compound a mixture of components described below. The extrudate was cooled in a water bath and chopped into pellets. The pellets were then coated with 0.1% Ultra-Talc 609 to prevent agglomeration, dried at 30° C., and extruded through a flat die to form a structure for property testing.

The twin screw extruder was operated with zone 1 (pellet feed zone) at 150° C., zone 2 at 160° C., zones 3–6 at 170° C., zones 7–8 at 165° C., and zones 9–11 at 160° C. The screw speed was set at 200 rpm. Pellets of polylactide (PLA) polymer, which is a copolymer of lactide with 0.35 wt. percent of epoxidized soybean oil and having a number average molecular weight of 104,000 and a D-level of 11%, available from Cargill, were fed into zone 1 at a rate of 123 g/min using an AccuRate feeder. A plasticizer, acetyl tri-n-butyl citrate from Morflex, Inc. was injected into zone 3 of the extruder at ambient temperatures using a liquid injection system. The plasticizer was fed in at a rate of 31.5 g/min providing a composition of 20.4% plasticizer.

The compounded mixture containing 20% plasticizer was then dry blended with sufficient amounts of the PLA used in the initial compounding (Mn-104,000, D-level of 11%) to obtain mixtures of 0, 5, 10, 15, and 20% plasticizer. These mixtures were then extruded on a ¾" Killion extruder, through a six inch flat die, into film having a 3.25 mil thickness (0.00325"). The Killion extruder operated with zone 1 at 280° F., zone 2 at 290° F., zone 3 at 300° F., and zone 4, the adapter, and the die all at 315° F.

The glass transition temperature ($T_g$) for each film was determined using Differential Scanning Calorimetry (DSC) according to procedure known in the art. A typical procedure includes taking a small sample of the film (5–20 mg) and placing it in a sealed capsule. The capsule is loaded in to the DSC and cooled to a temperature well below the expected $T_g$, e.g., −100° C. The sample is then heated at a rate between 5° C./min and 20° C./min and the heat input relative to a blank reference cell is recorded. The glass transition temperatures are evaluated, and recorded as the midpoint of the typical sigmoidal curve. The sample is evaluated on the first upheat of the DSC, to avoid any mixing of the sample phases.

The films were then aged and tested for tear propagation resistance and for blocking resistance. The tear propagation resistance test was conducted according to ASTM Method D 1922-89. The blocking resistance test involved placing two films on top of each other and placing thereon a 400 gm weight with a 2.2 in$^2$ contact area. This was left in a temperature controlled environment for 2.0 hours at 50° C. and checked for blocking. The blocking scale for this test ranges from 0 for no blocking to 5 for complete fusion of the two layers. The results of the tear propagation resistance and blocking resistance tests are provided in Table 1.

TABLE 1

| Percent Plasticizer | Elmendorf Tear (gm$_f$) MD (avg) | TD (avg) | Blocking Level | Tg (° C.) | Normalized Elmendorf (gm$_f$/mil) MD | TD |
|---|---|---|---|---|---|---|
| 0 | 18 | 14 | 1 | 60 | 5.5 | 4.3 |
| 5 | 19.7 | 21.8 | 2 | 52 | 6.1 | 6.7 |
| 10 | 31.2 | 26.33 | 4 | 41 | 9.6 | 8.1 |
| 15 | 704 | 816 | 5 | 30 | 220 | 250 |
| 20 | 1,510 | 1600+ | 5 | 19 | 460 | 490 |

The results in Table 1 indicate that blocking resistance is inversely related to tear propagation resistance for single layer, plasticized films of polylactide. The results further indicate that the glass transition temperature ($T_g$) is directly related to the amount of plasticizer therein. It is a discovery of the present invention that highly plasticized films of polylactide, while providing the desired properties of low $T_g$ and high tear strength, develop severe blocking problems. It should be appreciated that a blocking level of 1 indicates that there was substantially no blocking which indicates that there was at most minor adhesion but that the films could be pulled apart without significant deformation.

The normalized Elmendorf tear values are used to get approximate tear values of a 1 mil film.

Example 2

Example Showing Multilayer Film with Good Blocking Resistance and Good Tear Propagation Resistance A multilayer film was produced on a 10", four layer, Streamlined Coextrusion Die (SCD) blown film die manufactured by Brampton Engineering. Layer configuration of the die is as follows from outside to inside layers of the die, A/B/D/C. Three 3½" David Standard extruders fed the A, D, and C layers while a 2½" David Standard extruder fed B layer. The process line also utilized a Brampton Engineering rotating air ring for polymer cooling. Layers B and D contained PLA (Mn=103,000, D-level of 11%) plasticized with 20% Citroflex which was compounded as described in Example 1. Layers A and C contained PLA (Mn=66,000, D-level of 3%) dry blended with 10% Biopol D300G, supplied by Zeneca Corporation. Layer ratios for the film were A-19%, C=21%, combination of B and D=60% of the total film structure. The thickness of the film produced was 2.25 mil (0.00225"). The processing conditions for the film are provided in Table 2.

TABLE 2

|  | Extruder A | Extruder B | Extruder C | Extruder D |
|---|---|---|---|---|
| Zone 1 | 300 | 300 | 300 | 300 |
| Zone 2 | 310 | 310 | 310 | 310 |
| Zone 3 | 320 | 320 | 320 | 320 |
| Zone 4 | 340 | 330 | 330 | 340 |
| Zone 5 |  | 340 | 340 |  |
| Scn Chngr | 330 | 330 | 330 | 330 |
| Adapter 1 | 330 | 330 | 330 | 330 |
| Adapter 2 | 330 | 330 | 330 | 330 |
| Adapter 4 | 330 | 330 | 330 | 330 |
| Die 1 | 330 | 330 | 330 | 330 |
| Die 2 | 330 | 330 | 330 | 330 |
| Die 3 | 330 | 330 | 330 | 330 |
| Pressure | 1,280 | 1,670 | 1,640 | 1,310 |
| Melt Temp | 336 | 338 | 338 | 339 |
| Screw Spd | 14 | 50 | 48 | 12 |
| Amps | 50 | 40 | 45 | 120 |
| Line Spd | 122 fpm |  |  |  |
| Notes | PLA/Biopol blend | Plasticized PLA | Plasticized PLA | PLA/Biopol blend |

Note: Temperatures in table 2 are given in ° F.

Tear propagation resistance and blocking resistance testing was conducted on the multilayer film according to the procedure described in Example 1. The test results are provided in Table 3. Additionally, the multilayer film exhibited no sign of blocking when tested at 70° C. for 24 hours.

TABLE 3

| Elmendorf Tear (gm_f) | | | Normalized Elmendorf Tear (gm_f/mil) | |
|---|---|---|---|---|
| MD (avg) | TD (avg) | Blocking Level | MD | TD |
| 112 | 242 | 0 @ 70° C. | 50 | 107 |

The results in Table 3 indicate that the non-plasticized outer layers prevent blocking while the plasticized inner layers provide the tear resistance of the film.

The normalized Elmendorf tear, although not recommended by ASTM, can be used to provide an estimate of the tear strength of a 1 mil film.

Example 3

Example Showing Bag Making Ability on a Commercial Line

The multilayer film prepared in Example 2 was converted into bags using an in-line bag machine manufactured by Battenfeld Gloucester Engineering Co., Inc. downstream of the extrusion line nips. This example demonstrates the feasibility of making bags on a commercial scale line, and at commercial speeds, from multilayer films according to the present invention.

Example 4

Example Showing Importance of Viscosity Matching

Film samples were run on a 6" 7-layer SCD blown film die manufactured by Brampton Engineering, Inc. with a die gap of 0.060" and a Uni-Flo air ring for film cooling. Labeling of the die layers are from outside to inside A, B, C, D, E, F, G. Layers B, C, D, E, and F were fed by five 30 mm Brampton extruders. Layers A and G were fed by two 45 mm Brampton extruders. In making the film samples layers A and G were filled with 0.85MI (melt index) polyethylene and cooled down to 100° F. to "freeze" the layers and effectively make the die a five-layer system.

Layers C, D, and E contained PLA (Mn=102,000) plasticized with 20% Citroflex which was compounded as described in Example 1. Layers B and F contained PLA dry blended with 10% Biopol D300G, supplied by Zeneca Corporation. Two different molecular weight PLA were used in the blends for the B and F layers. This allowed us to determine the effects of viscosity on the ability to minimize the film's outer layer percentage. Mn's of 66,000 and 102,000 were utilized. Rabinowitsch corrected viscosities at 177° C. and 200 s$^{-1}$ for the core layer material was approximately 300 Pa·s, and for the 66,000 Mn material it was 500 Pa·s, and 700 Pa·s for the 102,000 Mn material.

In running the films the outer film layers were run to the minimum thickness percentage as possible while maintaining consistent flow and good film appearance. Additionally it was found that when the outer layers were run to their minimum the bubble/tube stability would be jeopardized and the bubble would collapse, resulting in a less of film production. With the Mn of the PLA in the outer layers at 66,000, layer ratios of both B and F lines were obtainable at 5–10% of the total film structure each. This led to the plasticized layers constituting 80–90% of the total film structure. When the Mn of the PLA in the outer layers was at the 102,000 level the lowest ratio for B and F layers obtainable was 20% each. This resulted in the plasticized layers constituting 60% of the total film structure. As the outer layer percentages were reduced during this trial, there were initially flow instability lines apparent on the film at ratios of less than 20% for B and F layers. As the percentages approached 18% the bubble collapsed. Applicants believe this was due to holes generated in the film from the flow instability at the layer interface.

Viscosity matching allows production of films with maximum thickness of the central flexible layer, which is believed to give a maximum tear strength. Viscosity matching can be either through compositional control, as in the present example or through use of a multi-temperature die.

Processing conditions for the films are provided in Table 4.

TABLE 4

|  | A line | B line | C line | D line | E line | F line | G line |
|---|---|---|---|---|---|---|---|
| Zone 1 | 100 | 290 | 290 | 290 | 290 | 290 | 100 |
| Zone 2 | 100 | 340 | 320 | 320 | 320 | 340 | 100 |
| Zone 3 | 100 | 350 | 330 | 330 | 330 | 350 | 100 |
| Adapter | 100 | 350 | 340 | 340 | 340 | 360 | 100 |
| Die 1 | 350 | | | | | | |
| Die 2 | 350 | | | | | | |
| Die 3 | 350 | | | | | | |
| Die 4 | 350 | | | | | | |
| Die 5 | 350 | | | | | | |
| Die 6 | 350 | | | | | | |
| Material | 0.85 MI PE | PLA/Biopol Blend | Plasticized PLA | Plasticized PLA | Plasticized PLA | PLA/Biopol Blend | 0.85 MI PE |

Example 5

Example Showing Disadvantage of Having no Anti-Blocking Agent in the Outer Layers Films were prepared on the equipment described in Example 4 under the same processing conditions. Plasticized PLA was compounded as in Example 1 with the exception that 0.1 wt. % Luperco 233-XL supplied by Elf Autochem was added to compound. This was then fed into C, D, and E layers. PLA and PLA blended with Biopol D300G were utilized in the B and F layers to determine the effects of adding anti-blocking agents to the outer layers of the films. The PLA used had an Mn of 66,000. The composition containing the Biopol consisted of 95% PLA and 5% Biopol D300G. The Biopol D300G was utilized as an anti-blocking agent in this instance.

During extrusion of the films, the sample containing only PLA in layers B and F showed blocking at a level 3, as described in Example 1, upon collapsing the bubble at the take-off nip. The film containing the blend of PLA and Biopol in the B and F layers showed blocking at a level 0 upon collapsing the bubble. Additional testing of the film for blocking resistance was completed in accordance with the test described in Example 1 except that the films were tested for 24 hours.

TABLE 5

| Outer Layer Composition | Nip Blocking Level | Blocking Level in Test |
|---|---|---|
| PLA | 3 | 5 |
| PLA/Biopol Blend | 0 | 1 |

Careful selection of the outer-layer material is important for optimal blocking resistance.

Example 6

Example Showing Use of Non-PLA Materials in Multi-Layer Film Structures

Films were produced using the equipment and processing conditions described in Example 4 to produce structures containing materials other than PLA as the base material for one or more of the film layers. When plasticized PLA was utilized it was prepared in accordance to the method described in Example 1. Again only the B, C, D, E, and F layers of the die were utilized to produce the films. In all of these films there was an attempt to make a flexible core layer surrounded by rigid, non-blocking outer layers.

TABLE 6

| | Material | | | | |
|---|---|---|---|---|---|
| Sample | Layer B | Layer C | Layer D | Layer E | Layer F |
| 1 | PLA | PVOH | PVOH | PVOH | PLA |
| 2 | PLA | Polyethylene | Polyethylene | Polyethylene | PLA |
| 3 | Biopol | Plasticized PLA | Plasticized PLA | Plasticized PLA | Biopol |
| 4 | EVOH | Plasticized PLA | Plasticized PLA | Plasticized PLA | EVOH |

In all of the above cases except for sample #3 there was poor adhesion between the PLA layers and the "other" material layers. In the case of sample #3 a film with 5% layer ratios for B and F layers was accomplished. This film showed no blocking at the haul off nip and also demonstrated a blocking level of 0 when tested in accordance to the test described in Example 1. The PVOH was supplied as VINEX 2144 by Air Products And Chemicals, Inc., the PE was a LLDPE (grade 2045) supplied by Dow, and the EVOH was supplied by Eval Corporation.

Example 7

Example Showing Effects of Layer Ratios on Physical Properties

Films were processed on the equipment described in Example 4 to produce films with varying layer ratios. The outer layers, layers B and F, utilized PLA dry blended with 10% Biopol D300G. The inner layers of the film, layers C, D, and E, utilized PLA compounded with 20% Citroflex plasticizer as described in Example 1. The following films were produced with thickness ranging from 1.5–1.75 mil (0.0015"–0.00175").

TABLE 7

| Sample # | B Layer Ratio (%) | C, D, E, Combined Layer Ratio (%) | F Layer Ratio (%) |
|---|---|---|---|
| 1 | 25 | 50 | 25 |
| 2 | 20 | 60 | 20 |
| 3 | 15 | 70 | 15 |
| 4 | 10 | 80 | 10 |
| 5 | 5 | 90 | 5 |

The films were conditioned in a 50% relative humidity chamber at 20–25° C. and tested for tear propagation resistance according to ASTM D-1922, tensile properties according to ASTM D-882 method A3, and impact resistance according to ASTM D-3420 with the results provided in Table 8.

TABLE 8

| Outer Layer (%) | Tear Resistance (g_f) (Avg) | | Normalized Tear (gm_F/mil) | Ultimate Tensile (psi) (Avg) | | Ultimate Elong. (%) (Avg) | | Yield Tensile (psi) (Avg) | | Yield Elong. (%) (Avg) | | Tensile Strength? | |
|---|---|---|---|---|---|---|---|---|---|---|---|---|---|
| | MD | TD | | MD | TD | MD | TD | MD | TD | MD | TD | MD | TD |
| 25 | 36.5 | 47.5 | 23 29 | 5,474 | 4,878 | 296 | 342 | 4,536 | 3,738 | 5.4 | 4.6 | 84 | 81 | 231 |
| 20 | 40.5 | 46.5 | 25 28 | 5,670 | 4,813 | 329 | 317 | 3,838 | 3,418 | 5.2 | 6.2 | 74 | 55 | 643 |
| 15 | 49 | 64.5 | 31 40 | 5,189 | 4,476 | 351 | 313 | 3,544 | 2,673 | 5.6 | 6.1 | 63 | 44 | 660 |
| 10 | 56.5 | 89.S | 35 56 | S,053 | 4,299 | 340 | 343 | 2,470 | 2,087 | 5.4 | 4.5 | 46 | 46 | 812 |
| 5 | 94.3 | 128 | 58 80 | 4,921 | 4,845 | 367 | 422 | 1,916 | 1,608 | 6.2 | 9.8 | 31 | 16 | 1,236 |

The data in Table 8 demonstrates the effect the layer ratios have on the tear propagation resistance, the yield strength, and the impact strength. Increasing the thickness of the inner, flexible layer, and decreasing the thickness of the outer layers, provides high tear resistance and impact strength, although yield is reduced. The data also demonstrates that the layer ratios do not have much of an effect on the ultimate tensile strength, the ultimate elongation, or the yield elongation.

The normalized tear force is provided as an estimate for a 1 mil film, although it is preferred to test a 1 mil film directly.

Example 8

Example Showing Non-Migratory Plasticizer in Coextruded Film

The film produced in Example 2 was run on a DSC to determine the $T_g$ of the two distinct types of PLA present in the structure. Evaluating the shift in $T_g$ over time provides an indication of plasticizer migration or lack of migration. An upward shift in the core (plasticized) layer's $T_g$ would indicate migration of plasticizer out of the core layer. This would correspond to a downward shift of the outer layer $T_g$ as the plasticizer migrated into these layers. The DSC test results are provided in Table 9.

TABLE 9

| DSC Test Date | $T_{g1}$ (° C.) for core layer | $T_{g2}$ (° C.) for outer layer |
|---|---|---|
| 12/27/94 | 18.3 | 53.45 |
| 01/04/95 | 18.98 | 54.07 |
| 01/20/95 | 17.49 | 53.05 |
| 02/03/95 | 15.24 | 56.30 |
| 08/17/95 | 16.76 | 53.77 |

The data in Table 9 demonstrates that there is no appreciable change in the $T_g$ of the layers of the film structure over an 8 month period. This indicates a lack of migration of the plasticizer over time for the tested multilayer film structure.

Example 9

Example Showing Compostable Properties of Coextruded Film

The multilayer film of Example 2 was tested to determine the rate and extent of degradation in a compost environment. For comparative purposes, sample of kraft paper and cellulose were similarly tested to evaluate the rate and extent of degradation in a compost environment. The kraft paper was from a typical grocery bag and the cellulose was microcrystalline cellulose from Avicel.

For all three samples, a modified version of ASTM D5338-92 test was performed according to ASTM D5338-92 except that a constant temperature of 58° C. was provided in order to more conveniently approximate natural composting conditions. The amount of material biodegraded was calculated based upon measuring the amount of carbon dioxide evolved therefrom.

Test results were plotted in the graph of FIG. 3 as "Cummulative % Biodegradation (CO2-C)" as a function of time. The graph demonstrates that the multilayer film of Example 2 degrades at a rate and to an extent fairly close to cellulose and kraft paper.

Comparative Example 1

Monolayer films having a thickness of 2 mil were prepared from polybutylene(succinate) and from polybutylene (succinate-adipate copolymer). The polymer samples are available as Bionolle® 1001 and 3001 from Showa Highpolymer Co., Ltd. The films were blown using a 1" Killion die and 1" Killion single screw general purpose extruder with 3:1 compression ratio and 24:1 L:D. A single tip air ring was used to provide bubble inflation. Throughput was about 8 lb/hr.

The films were tested for Elmendorf tear following ASTM D1922-89, with the following results, all in grams-force ($gm_f$).

| | polybutylene (succinate) | | polybutylene (succinate-adipate copolymer) | |
|---|---|---|---|---|
| Temperature | MD | TD | MD | TD |
| 23° C. | 31 | 49 | 34 | 54 |
| 10° C. | 26 | 35 | 29 | 43 |
| 0° C. | 31 | 34 | 30 | 44 |

The polybutylene(succinate) film exhibited a $T_g$ of −37° C. and 47.4 J/g crystallinity, with a peak melting point of 113° C. The polybutylene(succinate-adipate copolymer) film had a Tg of −45° C. and 34 J/g crystallinity, with a melting temperature of 94° C. The strength, however, is insufficient for commercial use as a lawn refuse bag.

Example 10

Two films were prepared on a multilayer blown film line to prepare a A-B-A composition. The "A" material was fed using a ¾" Brabender general purpose extruder, the "B" material was fed using a 1" Killion general purpose extruder, and the die was a 1" Killion 3-layer die side fed, with a 0.030" die gap. The "A" material was fed at a rate of 3.6 lb/hr and had a melt temperature of 365° F. The "B" material was fed at 8.4 lb/hr and had a melt temperature of 325° F. A single lip air ring was used for inflation and the film take-off speed was about 10–30 ft/min.

The core layer in each case consisted of poly(lactide) with a number average molecular weight of about 100,000 and which included 0.35 wt % of epoxidized soybean oil in the polymerization. The overall optical composition was 85% S-lactic acid residuals and 15% R-lactic acid residuals, from lactide. The core layer additionally contained 20 wt % of the plasticizer acetyl ti-n-butyl citrate, available as Citroflex™ A-4 from Morflex, Inc. The outer layer for film one was a blend of 90 wt % poly(lactide) and 10 wt % poly(hydroxy butyrate-co-hydroxy valerate), called PHBV for short, available as Biopol™ D300G from ICI.

For the first multilayer film, the outer layer included a polylactide polymer containing 0.35 wt % epoxidized soybean oil added prior to polymerization in a batch reactor and having a number average molecular weight of about 90,000 and an overall optical composition including 95% S-lactic acid residuals and 5%. R-lactic acid residuals.

For the second multilayer film, the outer layer included a polybutylene(succinate) polymer, available as Bionolle 1001 from Showa Highpolymer Co., Ltd.

Both multilayer films were 2 mil thick and had a layer ratio of 15/70/15 percent by weight. Table 10 shows the Elmendorf tear results in $gm_f$, according to ASTM D1922-89, for each multilayer film wherein the films are identified by their outer layer.

TABLE 10

| Temperature | poly(lactide)/PHBV blend outer layer | | polybutylene (succinate) outer layer [3054-8-2] | |
| --- | --- | --- | --- | --- |
| | MD | TD | MD | TD |
| 23° C. | 93 | 150 | 172 | 176 |
| 10° C. | | | 80 | 79 |
| 0° C. | 12 | 17 | 47 | 54 |

The tests show that each film exhibits good tear strength at 23° C. The low temperature tear strength of the film with an outer layer of polybutylene(succinate) was superior to the film with an outer layer of poly(lactide)/PHBV. It is believed that the low $T_g$ (estimated to be less than −30° C.) of the outer layer for film two assists in giving good properties at low temperature.

Example 11

Two films, each 2 mil thick, were prepared on a blown film line according to the procedure described in Example 10. Each film included a core layer of polylactide with 85–88% S-lactic acid residuals and 12-15% R-lactic acid residuals (from lactide) to form an amorphous film with number average molecular weight of 85,500 for film 1 and 106,000 for film 2. The polylactide included 0.35 wt % of epoxidized soybean oil included during the polymerization, carried out in a batch reactor. The polymer was blended with 25 wt % of a plasticizer which was tri-n-butyl citrate, available as Citroflex™ C-4 from Morflex, Inc. The Elmendorf tear properties are shown in the table 11.

TABLE 11

| Temperature | polybutylene (succinate) outer layer (film 1) | | polybutylene (succinate) outer layer (film 2) | |
| --- | --- | --- | --- | --- |
| | MD | TD | MD | TD |
| 23° C. | 186 | 304 | 139 | 147 |
| 10° C. | | | 72 | 110 |
| 0° C. | 47 | 66 | 76 | 75 |

Film 1 exhibited two Tg's, one at about −35° C. corresponding to the outer layer and one at 8.6° C. for the plasticized poly(lactide) core layer. The outer layer exhibited a Tm of 109° C. with 16.7 J/g on a whole film basis, corresponding to 56 J/g on an outer layer basis. DSC results are not available on film 2.

Each of these two samples shows good tear strength and had good blocking resistance to at least 60° C.

While the invention has been described in conjunction with specific embodiments thereof, it is evident that different alternatives, modifications, variations, and uses will be apparent to those skilled in the art in view of the foregoing description. Accordingly, the invention is not limited to the embodiments presented herein.

What is claimed:

1. A compostable multilayer film comprising:
   (a) core layer comprising a polylactide polymer, the core layer having a $T_g$ below about 20° C., and having first and second opposed surfaces;
   (b) first blocking reducing layer covering the first surface of said core layer; and
   (c) second blocking reducing layer covering the second surface of said core layer;
   wherein at least one of said blocking reducing layers comprises a semicrystalline polymer composition comprising an aliphatic polyester polymer.

2. The compostable multilayer film according to claim 1, wherein the blocking reducing layer comprising a semicrystalline polymer composition has a crystallinity of greater than 10 J/g as determined by a differential scanning calorimeter.

3. The compostable multilayer film according to claim 1, wherein the blocking reducing layer comprising a semicrystalline polymer composition has a crystallinity of greater than 30 J/g as determined by a differential scanning calorimeter.

4. The compostable multilayer film according to claim 1, wherein the aliphatic polyester polymer comprises a polymer selected from the group consisting of polyethylene (oxalate), polyethylene(succinate), polybutylene(oxalate), polybutylene(succinate), polypentamethyl(succinate), polyhexamethyl(succinate), polyheptamethyl(succinate), polyoctamethyl(succinate), polyethylene(succinate-co-adipate), polybutylene(succinate-co-adipate), polybutylene (oxylate-co-succinate), polybutylene(oxylate-co-adipate), and mixtures thereof.

5. The compostable multilayer film according to claim 1, wherein the semicrystalline polymer comprises polybutylene succinate homopolymer.

6. The compostable multilayer structure according to claim 1, wherein said compostable multilayer film has a biodegradability value of about 20 percent or higher after 40 days according to ASTM D5338-92, modified to test at about 58° C.

7. The compostable multilayer structure according to claim 1, wherein said compostable multilayer structure has a biodegradability value of about 50 percent or higher after 40 days according to ASTM D5338-92, modified to test at about 58° C.

8. The compostable multilayer film according to claim 1, wherein the polylactide polymer is a copolymer prepared by reacting lactide monomer with non-lactide or non-lactic acid monomer.

9. The compostable multilayer structure according to claim 8, wherein the non-lactide monomer is epoxidized multifunctional oil.

10. The compostable multilayer film according to claim 1, wherein at least one of the blocking reducing layers includes an antiblocking polymer additive selected from the group consisting of poly(hydroxybutyrate) and poly (hydroxybutyrate-co-hydroxyvalerate).

11. The compostable multilayer film according to claim 1, wherein the core layer is peroxide modified to reduce plasticizer migration.

12. A method for manufacturing a compostable multilayer film, said method comprising the step of:
   coextruding at least three layers, said layers comprising
   (a) core layer comprising a polylactide polymer, the core layer having a $T_g$ below about 20° C., and having first and second opposed surfaces;
   (b) first blocking reducing layer covering the first surface of said core layer; and
   (c) second blocking reducing layer covering the second surface of said core layer;
   wherein at least one of said blocking reducing layers comprises a semicrystalline polymer composition comprising an aliphatic polyester polymer.

13. The method for manufacturing a compostable multilayer film according to claim 12, further comprising a step of blowing the layers.

14. The method for manufacturing a multilayer film according to claim 13, wherein the step of blowing comprises double bubble blowing.

15. The method for manufacturing a multilayer film according to claim 12, further comprising the step of blow molding.

16. A compostable multilayer structure comprising:
(a) compostable substrate;
(b) core layer comprising a polylactide polymer composition covering said compostable substrate, said core layer having a $T_g$ below about 20° C.; and
(c) blocking reducing layer covering said core layer;
wherein said blocking reducing layer comprises a semicrystalline polymer composition comprising an aliphatic polyester polymer.

17. The compostable multilayer structure according to claim 16, wherein said compostable substrate comprises a cellulose-containing substrate.

18. The compostable multilayer structure according to claim 16, wherein the cellulose-containing substrate is paper.

19. The compostable multilayer structure according to claim 16, wherein said core layer comprises a polylactide polymer and an effective amount of a plasticizer to provide a $T_g$ for the core layer of below about 20° C.

20. A compostable multilayer film comprising:
(a) core layer comprising a polylactide polymer and at least 20% by weight, based on the weight of the core layer, of a plasticizer, said core layer having first and second opposed surfaces;
(b) first blocking reducing layer covering the first surface of said core layer; and
(c) second blocking reducing layer covering the second surface of said core layer;
wherein at least one of the blocking reducing layers comprises a polymer selected from the group consisting of polyethylene(oxalate), polyethylene(succinate), polybutylene(oxalate), polybutylene(succinate), polypentamethyl(succinate), polyhexamethyl(succinate), polyheptamethyl(succinate), polyoctamethyl(succinate), polyethylene(succinate-co-adipate), polybutylene(succinate-co-adipate), polybutylene(oxylate-co-succinate), polybutylene(oxylate-co-adipate), and mixtures thereof.

21. A compostable multilayer film comprising:
(a) core layer comprising a polylactide polymer composition exhibiting bonding between polylactide polymer chains, the core layer having a $T_g$ below about 20° C., and having first and second opposed surfaces;
(b) first blocking reducing layer covering the first surface of said core layer; and
(c) second blocking reducing layer covering the second surface of said core layer;
wherein at least one of said blocking reducing layers comprises a semicrystalline polymer composition.

22. A compostable multilayer film according to claim 21, wherein the polylactide polymer composition exhibiting bonding between polylactide polymer chains comprises peroxide modified polylactide polymer.

23. A compostable multilayer structure comprising:
(a) compostable substrate;
(b) core layer comprising a polylactide polymer composition exhibiting bonding between polylactide polymer chains, the core layer covering said compostable substrate and having a $T_g$ below about 20° C.; and
(c) blocking reducing layer covering said core layer and comprising a semicrystalline polymer composition.

24. A compostable multilayer film according to claim 23, wherein the polylactide polymer composition exhibiting bonding between polylactide polymer chains comprises peroxide modified polylactide polymer.

* * * * *